US009931999B2

(12) United States Patent
Line et al.

(10) Patent No.: US 9,931,999 B2
(45) Date of Patent: Apr. 3, 2018

(54) BACK PANEL LOWER CLIP ANCHORAGE FEATURES FOR DYNAMIC EVENTS

(71) Applicant: Ford Global Technologies, LLC, Dearborn, MI (US)

(72) Inventors: Johnathan Andrew Line, Northville, MI (US); Richard Joseph Soyka, Jr., Shelby Township, MI (US); Christian J. Hosbach, Taylor, MI (US); Marcos Silva Kondrad, Macomb, MI (US); Nicholas Alphonse Billardello, Macomb, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/973,302

(22) Filed: Dec. 17, 2015

(65) Prior Publication Data
US 2017/0174153 A1    Jun. 22, 2017

(51) Int. Cl.
*B60R 16/02* (2006.01)
*B60N 2/427* (2006.01)
(Continued)

(52) U.S. Cl.
CPC ........ *B60R 16/0215* (2013.01); *B60N 2/4228* (2013.01); *B60N 2/42709* (2013.01)

(58) Field of Classification Search
CPC .............. B60R 16/0215; B60N 2/4228; B60N 2/42709; B60N 2/686; B60N 2/68
(Continued)

(56) References Cited

U.S. PATENT DOCUMENTS 2,958,369 A    11/1960 Pitts et al.
3,403,938 A    10/1968 Cramer et al.
(Continued)

FOREIGN PATENT DOCUMENTS

EP    0754590    1/1997
EP    0926969    1/2002
(Continued)

OTHER PUBLICATIONS

"Imola Pro-fit", Cobra, (http://cobra.subesports.com/products/cat/seats/brand/Cobra/prodID/656), Date unknown, 2 pages.
(Continued)

*Primary Examiner* — Milton Nelson, Jr.
(74) *Attorney, Agent, or Firm* — Vichit Chea; Price Heneveld LLP

(57) ABSTRACT

A vehicle seating assembly includes a seatback frame having a lower cross member. A back panel is operably coupled to the seatback frame and includes internal posts configured to receive a retention clip. The retention clip includes first and second catches that engage notches on the internal posts of the back panel. The retention clips further include retention hooks. An anchorage bracket is operably coupled to the lower cross member and includes fastener slots configured to receive the retention hooks to secure the back panel with the anchorage bracket. Wire harness features are disposed on distal ends of the anchorage bracket. Wiring is routed between the lower cross member and the anchorage bracket.

20 Claims, 8 Drawing Sheets

(51) Int. Cl.
*B60N 2/42* (2006.01)
*B60N 2/68* (2006.01)

(58) Field of Classification Search
USPC .......................................... 297/452.18, 217.3
See application file for complete search history.

(56) References Cited

U.S. PATENT DOCUMENTS

| | | | |
|---|---|---|---|
| 3,929,374 | A | 12/1975 | Hogan et al. |
| 4,324,431 | A | 4/1982 | Murphy et al. |
| 4,334,709 | A | 6/1982 | Akiyama et al. |
| 4,353,595 | A | 10/1982 | Kaneko et al. |
| 4,541,669 | A | 9/1985 | Goldner |
| 4,629,248 | A | 12/1986 | Mawbey |
| 4,720,141 | A | 1/1988 | Sakamoto et al. |
| 4,915,447 | A | 4/1990 | Shovar |
| 5,171,062 | A | 12/1992 | Courtois |
| 5,174,526 | A | 12/1992 | Kanigowski |
| 5,518,294 | A | 5/1996 | Ligon, Sr. et al. |
| 5,560,681 | A | 10/1996 | Dixon et al. |
| 5,647,635 | A | 7/1997 | Aumond et al. |
| 5,755,493 | A | 5/1998 | Kodaverdian |
| 5,769,489 | A | 6/1998 | Dellanno |
| 5,826,938 | A | 10/1998 | Yanase et al. |
| 5,836,648 | A | 11/1998 | Karschin et al. |
| 5,902,014 | A | 5/1999 | Dinkel et al. |
| 5,913,568 | A | 6/1999 | Brightbill et al. |
| 5,951,039 | A | 9/1999 | Severinski et al. |
| 6,024,406 | A | 2/2000 | Charras et al. |
| 6,062,642 | A | 5/2000 | Sinnhuber et al. |
| 6,145,925 | A | 11/2000 | Eksin et al. |
| 6,155,593 | A | 12/2000 | Kimura et al. |
| 6,179,379 | B1 | 1/2001 | Andersson |
| 6,189,966 | B1 | 2/2001 | Faust et al. |
| 6,196,627 | B1 | 3/2001 | Faust et al. |
| 6,206,466 | B1 | 3/2001 | Komatsu |
| 6,217,062 | B1 | 4/2001 | Breyvogel et al. |
| 6,220,661 | B1 | 4/2001 | Peterson |
| 6,224,150 | B1 | 5/2001 | Eksin et al. |
| 6,296,308 | B1 | 10/2001 | Cosentino et al. |
| 6,312,050 | B1 | 11/2001 | Eklind |
| 6,364,414 | B1 | 4/2002 | Specht |
| 6,375,269 | B1 | 4/2002 | Maeda et al. |
| 6,394,546 | B1 | 5/2002 | Knoblock et al. |
| 6,454,353 | B1 | 9/2002 | Knaus |
| 6,523,892 | B1 | 2/2003 | Kage et al. |
| 6,550,856 | B1 | 4/2003 | Ganser et al. |
| 6,565,150 | B2 | 5/2003 | Fischer et al. |
| 6,619,605 | B2 | 9/2003 | Lambert |
| 6,682,140 | B2 | 1/2004 | Minuth et al. |
| 6,695,406 | B2 | 2/2004 | Plant |
| 6,698,832 | B2 | 3/2004 | Boudinot |
| 6,736,452 | B2 | 5/2004 | Aoki et al. |
| 6,758,522 | B2 | 7/2004 | Ligon, Sr. et al. |
| 6,808,230 | B2 | 10/2004 | Buss et al. |
| 6,824,212 | B2 | 11/2004 | Malsch et al. |
| 6,848,742 | B1 | 2/2005 | Aoki et al. |
| 6,860,559 | B2 | 3/2005 | Schuster, Sr. et al. |
| 6,860,564 | B2 | 3/2005 | Reed et al. |
| 6,866,339 | B2 | 3/2005 | Itoh |
| 6,869,140 | B2 | 3/2005 | White et al. |
| 6,890,029 | B2 | 5/2005 | Svantesson |
| 6,938,953 | B2 | 9/2005 | Håland et al. |
| 6,955,399 | B2 | 10/2005 | Hong |
| 6,962,392 | B2 | 11/2005 | O'Connor |
| 6,988,770 | B2 | 1/2006 | Witchie |
| 6,997,473 | B2 | 2/2006 | Tanase et al. |
| 7,040,699 | B2 | 5/2006 | Curran et al. |
| 7,100,992 | B2 | 9/2006 | Bargheer et al. |
| 7,131,694 | B1 | 11/2006 | Buffa |
| 7,159,934 | B2 | 1/2007 | Farquhar et al. |
| 7,185,950 | B2 | 3/2007 | Pettersson et al. |
| 7,213,876 | B2 | 5/2007 | Stoewe |
| 7,229,118 | B2 | 6/2007 | Saberan et al. |
| 7,261,371 | B2 | 8/2007 | Thunissen et al. |
| 7,309,105 | B2 | 12/2007 | Mundell et al. |
| 7,344,189 | B2 | 3/2008 | Reed et al. |
| 7,350,859 | B2 | 4/2008 | Klukowski |
| 7,393,005 | B2 | 7/2008 | Inazu et al. |
| 7,425,034 | B2 | 9/2008 | Bajic et al. |
| 7,441,838 | B2 | 10/2008 | Patwardhan |
| 7,467,823 | B2 | 12/2008 | Hartwich |
| 7,478,869 | B2 | 1/2009 | Lazanja et al. |
| 7,481,489 | B2 | 1/2009 | Demick |
| 7,506,924 | B2 | 3/2009 | Bargheer et al. |
| 7,506,938 | B2 | 3/2009 | Brennan et al. |
| 7,530,633 | B2 | 5/2009 | Yokota et al. |
| 7,543,888 | B2 | 6/2009 | Kuno |
| 7,578,552 | B2 | 8/2009 | Bajic et al. |
| 7,578,554 | B2 | 8/2009 | Lee et al. |
| 7,597,398 | B2 | 10/2009 | Lindsay |
| 7,614,693 | B2 | 11/2009 | Ito |
| 7,641,281 | B2 | 1/2010 | Grimm |
| 7,669,925 | B2 | 3/2010 | Beck et al. |
| 7,669,928 | B2 | 3/2010 | Snyder |
| 7,712,833 | B2 | 5/2010 | Ueda |
| 7,717,459 | B2 | 5/2010 | Bostrom et al. |
| 7,726,733 | B2 | 6/2010 | Balser et al. |
| 7,735,932 | B2 | 6/2010 | Lazanja et al. |
| 7,752,720 | B2 | 7/2010 | Smith |
| 7,753,451 | B2 | 7/2010 | Maebert et al. |
| 7,775,602 | B2 | 8/2010 | Lazanja et al. |
| 7,784,863 | B2 | 8/2010 | Fallen |
| 7,802,843 | B2 | 9/2010 | Andersson et al. |
| 7,819,470 | B2 | 10/2010 | Humer et al. |
| 7,823,971 | B2 | 11/2010 | Humer et al. |
| 7,845,729 | B2 | 12/2010 | Yamada et al. |
| 7,857,381 | B2 | 12/2010 | Humer et al. |
| 7,871,126 | B2 | 1/2011 | Becker et al. |
| 7,891,701 | B2 | 2/2011 | Tracht et al. |
| 7,909,360 | B2 | 3/2011 | Marriott et al. |
| 7,931,294 | B2 | 4/2011 | Okada et al. |
| 7,931,330 | B2 | 4/2011 | Itou et al. |
| 7,946,649 | B2 | 5/2011 | Galbreath et al. |
| 7,963,553 | B2 | 6/2011 | Huynh et al. |
| 7,963,595 | B2 | 6/2011 | Ito et al. |
| 7,963,600 | B2 | 6/2011 | Alexander et al. |
| 7,971,931 | B2 | 7/2011 | Lazanja et al. |
| 7,971,937 | B2 | 7/2011 | Ishii et al. |
| 8,011,726 | B2 | 9/2011 | Omori et al. |
| 8,016,355 | B2 | 9/2011 | Ito et al. |
| 8,029,055 | B2 | 10/2011 | Hartlaub |
| 8,038,222 | B2 | 10/2011 | Lein et al. |
| 8,075,053 | B2 | 12/2011 | Tracht et al. |
| 8,109,569 | B2 | 2/2012 | Mitchell |
| 8,123,246 | B2 | 2/2012 | Gilbert et al. |
| 8,128,167 | B2 | 3/2012 | Zhong et al. |
| 8,162,391 | B2 | 4/2012 | Lazanja et al. |
| 8,162,397 | B2 | 4/2012 | Booth et al. |
| 8,167,370 | B2 | 5/2012 | Arakawa et al. |
| 8,210,568 | B2 | 7/2012 | Ryden et al. |
| 8,210,605 | B2 | 7/2012 | Hough et al. |
| 8,210,611 | B2 | 7/2012 | Aldrich et al. |
| 8,226,165 | B2 | 7/2012 | Mizoi |
| 8,342,607 | B2 | 1/2013 | Hofmann et al. |
| 8,371,655 | B2 | 2/2013 | Nonomiya |
| 9,039,081 | B2* | 5/2015 | Arefi .................... B60N 2/686 297/188.08 |
| 2001/0008814 | A1* | 7/2001 | Tsukamoto ......... B60R 16/0215 439/215 |
| 2004/0195870 | A1 | 10/2004 | Bohlender et al. |
| 2004/0227389 | A1* | 11/2004 | Yoshida .................. B60N 2/64 297/452.18 |
| 2005/0077774 | A1* | 4/2005 | Schwarz ............. B60N 2/5685 297/452.18 |
| 2005/0200166 | A1 | 9/2005 | Noh |
| 2006/0043777 | A1 | 3/2006 | Friedman et al. |
| 2007/0120401 | A1 | 5/2007 | Minuth et al. |
| 2008/0174159 | A1 | 7/2008 | Kojima et al. |
| 2009/0066122 | A1 | 3/2009 | Minuth et al. |
| 2009/0165263 | A1 | 7/2009 | Smith |
| 2009/0322124 | A1 | 12/2009 | Barkow et al. |
| 2010/0038937 | A1 | 3/2010 | Andersson et al. |
| 2010/0140986 | A1 | 6/2010 | Sawada |

(56) References Cited

U.S. PATENT DOCUMENTS

| | | |
|---|---|---|
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2016/0082904 A1* | 3/2016 | Marks ................ B60R 16/0215 428/99 |

FOREIGN PATENT DOCUMENTS

| | | | |
|---|---|---|---|
| EP | 1266794 | 3/2004 | |
| EP | 1462318 A1 | 9/2004 | |
| EP | 1123834 | 10/2004 | |
| EP | 1050429 | 10/2005 | |
| EP | 1084901 | 6/2006 | |
| EP | 1674333 A1 | 6/2006 | |
| EP | 1674333 | 8/2007 | |
| EP | 1950085 | 12/2008 | |
| EP | 1329356 | 11/2009 | |
| EP | 2743124 A1 * | 6/2014 | ............. B60N 2/68 |
| JP | 201178557 A | 4/2011 | |
| WO | WO9511818 | 5/1995 | |
| WO | WO9958022 | 11/1999 | |
| WO | WO2006131189 | 12/2006 | |
| WO | WO2007028015 | 8/2007 | |
| WO | 2008019981 A1 | 2/2008 | |
| WO | WO2008073285 | 6/2008 | |
| WO | WO2011021952 | 2/2011 | |
| WO | WO2012008904 | 1/2012 | |

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/(2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

* cited by examiner

BACK PANEL LOWER CLIP ANCHORAGE FEATURES FOR DYNAMIC EVENTS

FIELD OF THE DISCLOSURE

The present disclosure generally relates to a vehicle seating assembly, and more particularly to back panel lower clip anchorage features for dynamic events for a vehicle seating assembly.

BACKGROUND OF THE DISCLOSURE

To aid in the traveling experience of occupants, vehicle seating assemblies have been given a wide variety of options, many of which include power and/or data lines. The power and/or data lines may communicate with a motor and/or a vehicle controller area network (CAN) bus. In addition, these wires must be managed properly without adding excessive bulk or weight to the vehicle seating assembly. Proper wire management helps maintain the wires so that they are not damaged during controlled movement of the seat, while maintaining a slim and efficient profile of the vehicle seating assembly.

SUMMARY OF THE DISCLOSURE

According to one aspect of the present disclosure, a vehicle seating assembly includes a seatback frame having a lower cross member. A back panel is operably coupled to the seatback frame and includes internal posts configured to receive a retention clip. The retention clip includes first and second catches that engage notches on the internal posts of the back panel. The retention clips further include retention hooks. An anchorage bracket is operably coupled to the lower cross member and includes fastener slots configured to receive the retention hooks to secure the back panel with the anchorage bracket. Wire harness features are disposed on distal ends of the anchorage bracket. Wiring is routed between the lower cross member and the anchorage bracket.

According to another aspect of the present disclosure, a vehicle seating assembly includes a seatback frame having a lower cross member and a back panel. An anchorage bracket operably couples the back panel to the lower cross member. The anchorage bracket includes fastener slots configured to receive fasteners from the seatback frame. Wire harness features are disposed on distal ends of the anchorage bracket. Wiring is routed between the lower cross member and the anchorage bracket.

According to yet another aspect of the present disclosure, a vehicle seating assembly includes a seatback frame and a back panel. An anchorage bracket couples the back panel to the seatback frame and includes a lower support body. First and second fastener receptacles are configured to receive fasteners from the seatback frame. A recess is defined between the lower support body and the first and second fastener receptacles. Wire harness routers are disposed on distal ends of the anchorage bracket that route wiring across the lower support body.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
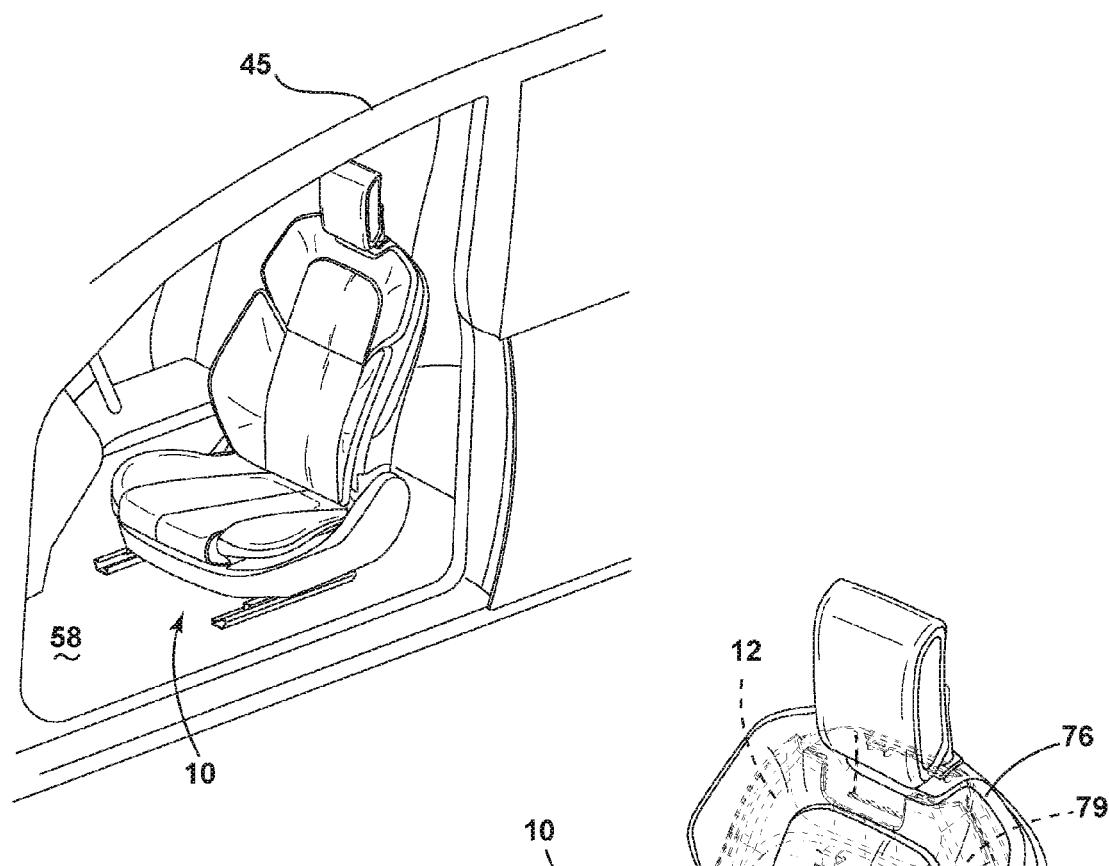
FIG. 1 is a top perspective view of one embodiment of a vehicle seating assembly disposed inside a vehicle.
Figure 2:
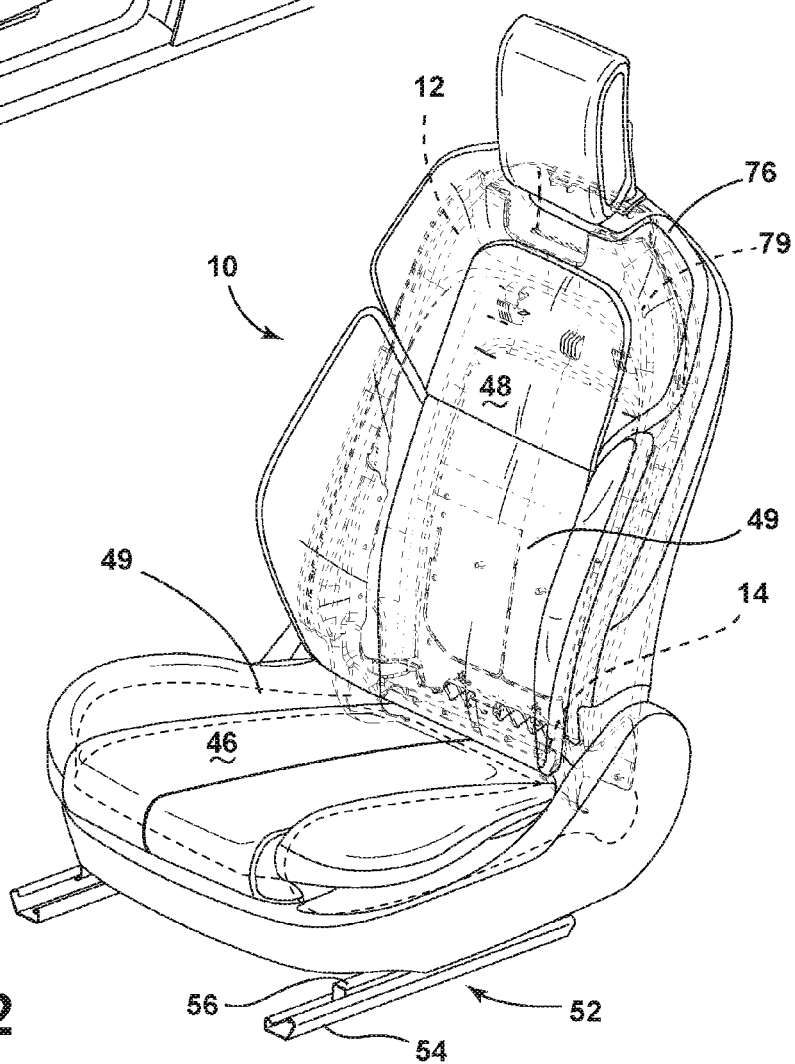
FIG. 2 is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-9B, reference numeral 10 generally designates a vehicle seating assembly having a seatback frame 12 that includes a lower cross member 14. A back panel 16 is operably coupled to the seatback frame 12 and includes internal posts 18 configured to receive a retention clip 20. The retention clip 20 includes first and second catches 22, 24 that engage notches 26 on the internal posts 18 of the back panel 16. The retention clips 20 further include retention hooks 30. An anchorage bracket 32 is operably coupled to the lower cross member 14 and includes fastener slots 34 configured to receive the retention hooks 30 to secure the back panel 16 with the anchorage bracket 32. Wire harness features 36 are disposed proximate distal ends 38 of the anchorage bracket 32. Wiring 40 is routed between the lower cross member 14 and the anchorage bracket 32.

With reference again to FIGS. 1 and 2, the vehicle seating assembly 10 is generally configured for use inside a vehicle 45 and includes a seat 46 and a seatback 48. Both the seat 46 and the seatback 48 include cushion assemblies 49 disposed thereon. It is generally contemplated that the vehicle 45 may include an automobile, such as a car, a truck, or a van, and that the vehicle seating assembly 10 will be adjustable within the vehicle 45. The vehicle seating assembly 10 is positioned on a slide assembly 52, including a rail 54 and a slide 56. The rail 54 is generally fastened to a floor 58 of the vehicle 45 and the slide 56 is fastened to the vehicle seating assembly 10. The rail 54 and the slide 56 are slidably adjustable relative to one another, such that the vehicle seating assembly 10 is adjustable fore and aft within the vehicle 45. The vehicle seating assembly 10 also includes a variety of other adjustability functions, including adjustability of the seatback 48, which may include upper thoracic and lumbar support, as well as reclining functions. The seat 46 is also adjustable and includes thigh and leg adjustability.

Figure 3:
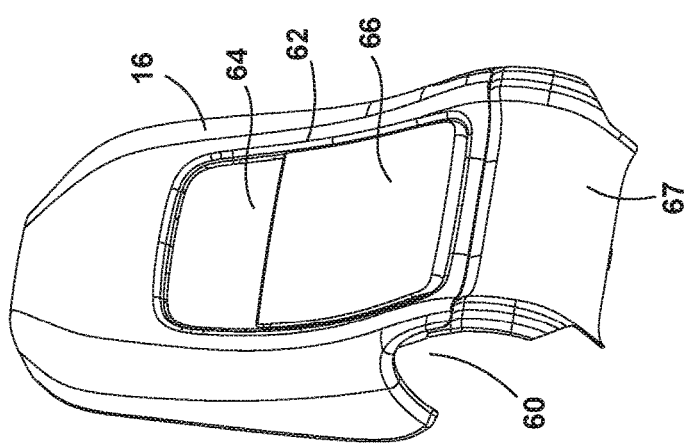
FIG. 3 is a rear bottom perspective view of one embodiment of a back panel of a vehicle seating assembly of the present disclosure.

With reference now to FIG. 3, the back panel 16 of the vehicle seating assembly 10 generally includes a rigid, monolithic structure formed from a single material. It is generally contemplated that the back panel 16 will be construction from a polymeric material. A lower portion of the back panel 16 includes recesses 60 configured to receive a rear portion of the seat 46 of the vehicle seating assembly 10. An intermediate rear portion 62 of the back panel 16 includes a recess 64 that is configured to receive and store items on the back panel 16 of the vehicle seating assembly 10. The back panel 16 may include a rear door 66, or a pocket, to retain the items to be stored. The rear door 66 may be rigid, flexible, or a combination thereof. Also, the rear door 66 may be positioned on a hinge or a similar mechanical feature. A lower portion of the back panel 16 includes a forward-arched concealing portion 67 configured to conceal a lower portion of the vehicle seating assembly 10.

Figure 5:
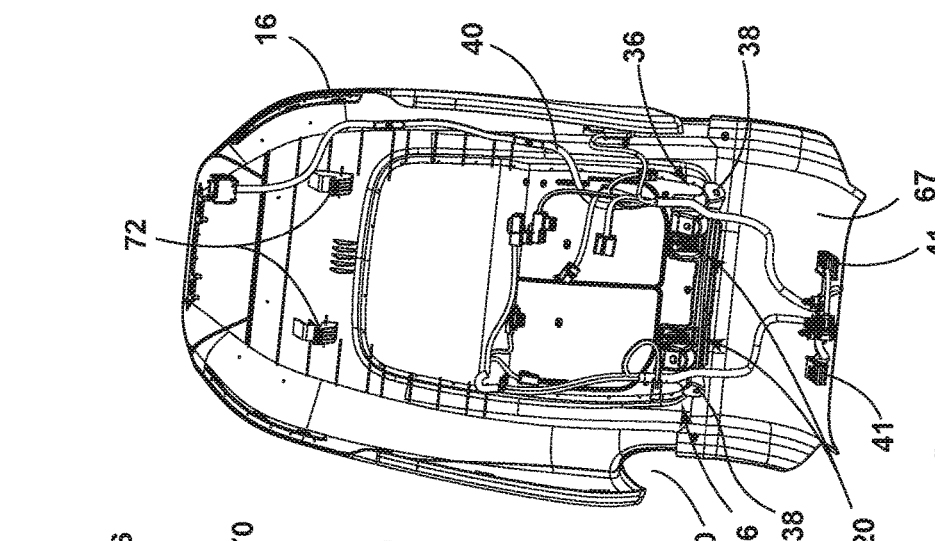
FIG. 5 is a front perspective view of a back panel with a wire harness coupled thereto.
Figure 4:
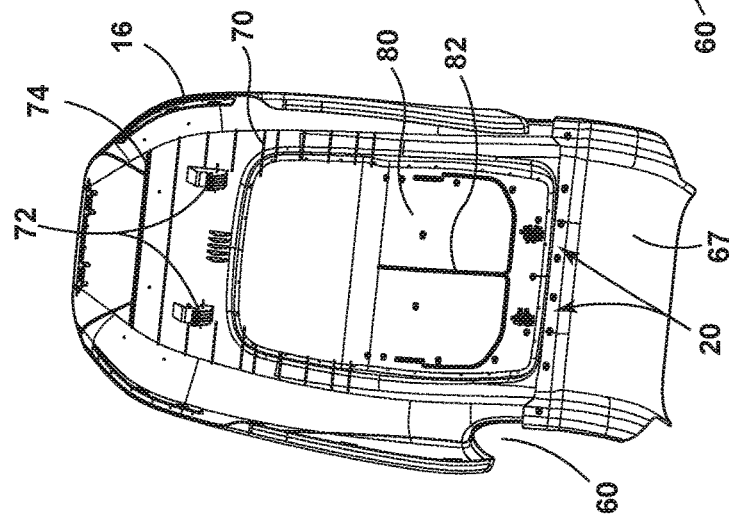
FIG. 4 is a front top perspective view of one embodiment of a back panel of the vehicle seating assembly of the present disclosure.

With reference to FIGS. 4 and 5, an intermediate or front portion 70 of the back panel 16 includes upper engagement clips 72 that engage and secure an upper portion 74 of the back panel 16 to a cross member 79 of the seatback frame 12 in an upper portion 76 of the seatback 48. A lower portion 80 of the back panel 16 includes a W-shaped controlled deformation area 82. The W-shaped controlled deformation area 82 is generally configured to allow for expansion of the lower portion 80 of the back panel 16 during a rear collision event. The wire harness feature 36 generally routes the wiring 40 around the W-shaped controlled deformation area 82. As shown in FIG. 4, the lower portion 80 of the back panel 16 also includes multiple retention clips 20. The retention clips 20 extend forward relative to the back panel 16 and are configured to engage the anchorage bracket 32 that is secured between sides of the seatback 48. The wiring 40, in the form of a plurality of wires, is disposed between a rear portion of the cushion assembly 49 and the seatback 48 and includes plugs 41 for coupling with the wiring 40 of the vehicle 45. The wiring 40 is managed through the wire harness features 36 of the anchorage bracket 32, which are disposed on the distal ends 38 of the anchorage bracket 32.

Figure 6A:
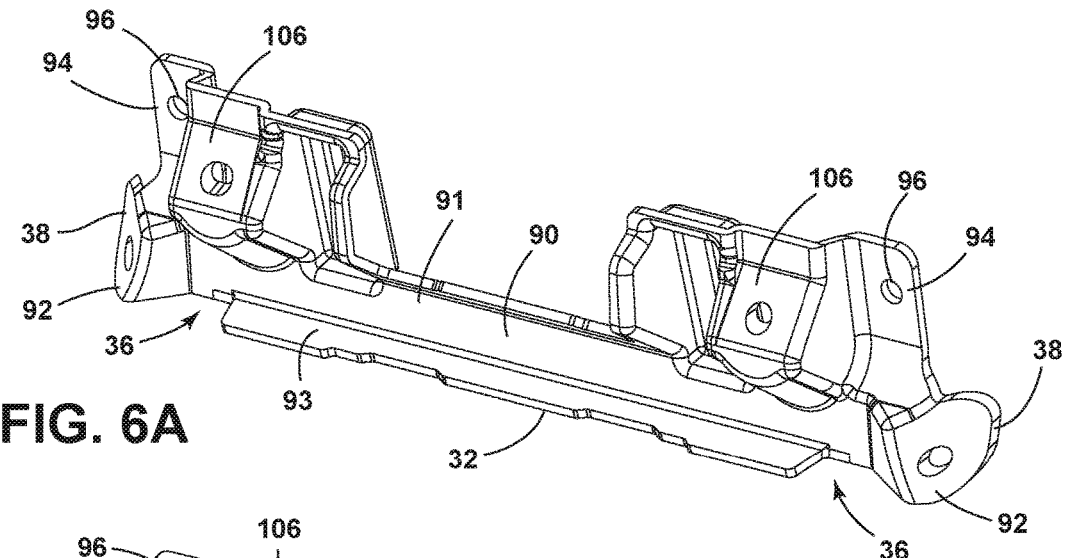
FIG. 6A is a front top perspective view of an anchorage bracket of the present disclosure.
Figure 6B:
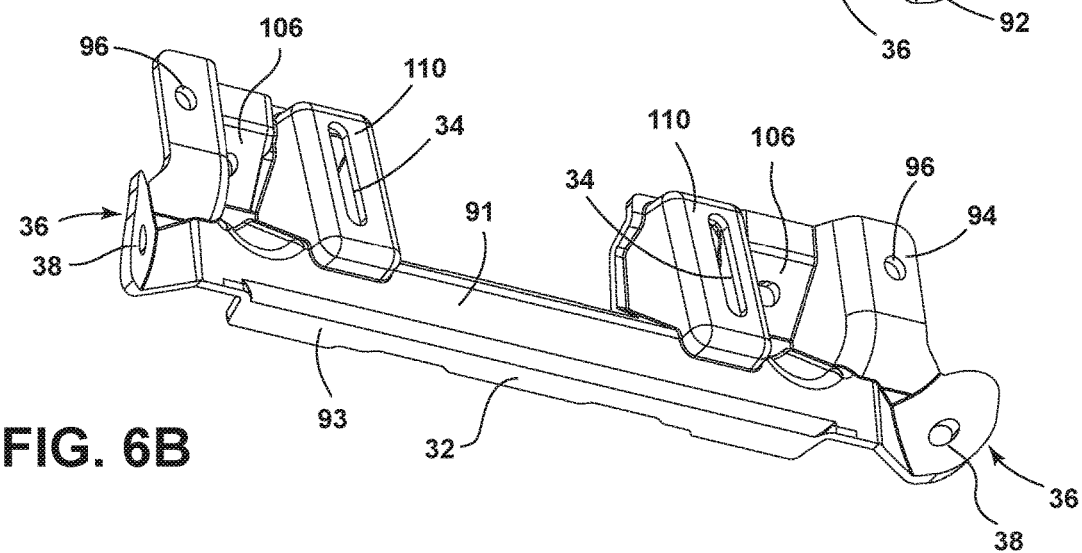
FIG. 6B is a rear bottom perspective view of the anchorage bracket of FIG. 6A.
Figure 6C:
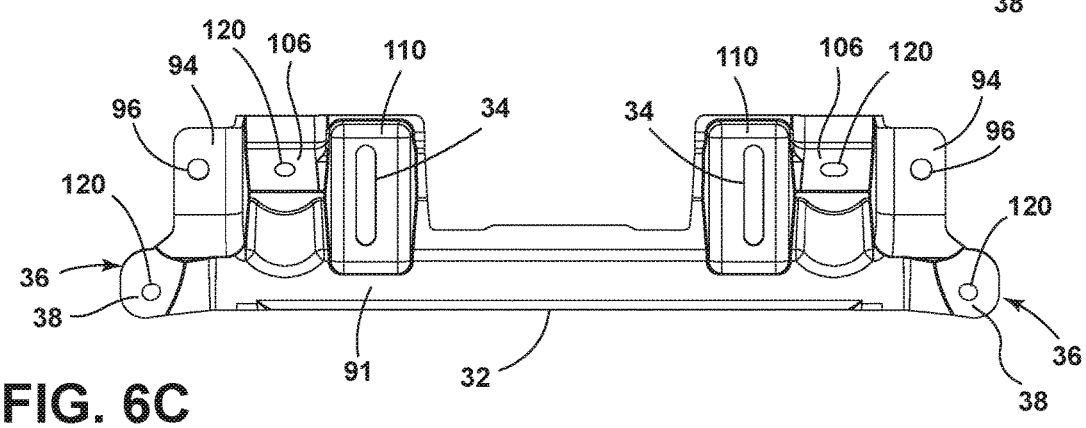
FIG. 6C is a rear elevational view of the anchorage bracket of FIG. 6A.
Figure 7A:
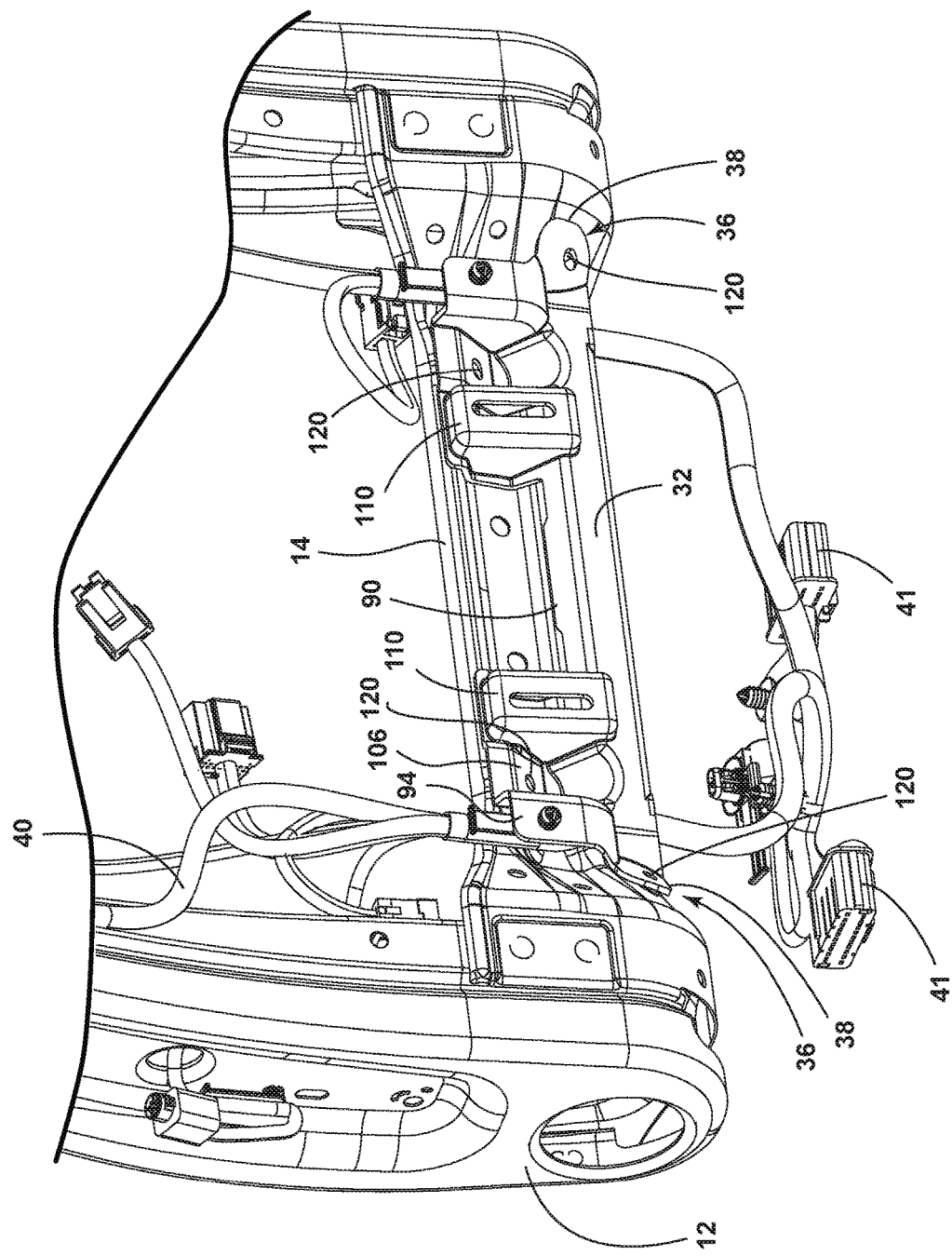
FIG. 7A is a top perspective view of one embodiment of a hard back panel and anchorage bracket of the present disclosure.
Figure 7B:
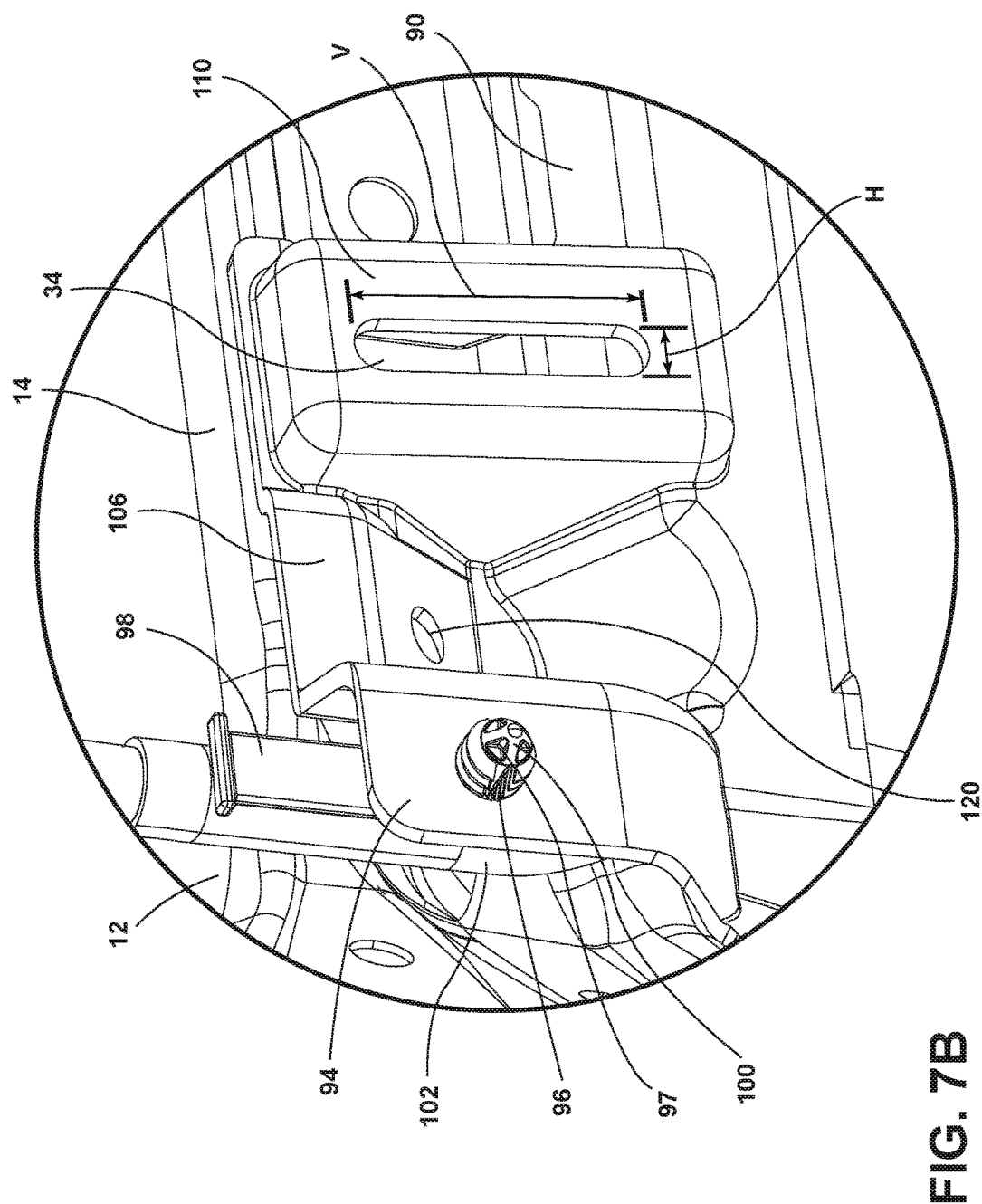
FIG. 7B is a top perspective view of a portion of the anchorage bracket adjacent a lower cross member of the vehicle seating assembly.

Referring now to FIGS. 6A-6C, the anchorage bracket 32 is configured for engagement with the seatback frame 12, and specifically with the lower cross member 14 of the seatback frame 12. The anchorage bracket 32 includes a shape that complements the lower cross member 14. The anchorage bracket 32 includes a central body 90 that terminates at first and second lower flanges 92 disposed at the distal ends 38 of the anchorage bracket 32. The central body 90 includes a vertically aligned portion 91 that is operably coupled with a horizontally aligned portion 93, which protrudes forward from the vertically aligned portion 91. First and second upper flanges 94 are located adjacent to and above the first and second lower flanges 92 and include apertures 96 that are generally configured to receive mechanical fasteners 97 of a wire securing element 98. In the illustrated embodiment, each mechanical fastener 97 includes a flanged post 100 that extends through the aperture 96. The wire securing element 98 also includes an elongate body 102 configured to route the wiring 40 from a position below the anchorage bracket 32 to a position above the anchorage bracket 32. For example, power and data lines may be routed to a motor in the upper seatback from a control located in a seat base. First and second upper abutting elements 106 are configured to, along with the first and second lower flanges 92, secure the anchorage bracket 32 in place against the lower cross member 14 of the seatback frame 12. Consequently, the shape and angle of the first and second upper abutting elements 106 and the first and second lower flanges 92 are complementary to the shape of a rear portion of the lower cross member 14 of the seatback frame 12 (FIGS. 7A and 7B). Also, the first and second upper flanges 94 are located outside the first and second upper abutting elements 106, respectively, but above the first and second lower flanges 92.

Referring again to FIGS. 6A-6C, first and second interconnecting regions 110 of the anchorage bracket 32, each of which includes one corresponding fastener slot 34, are integral with the central body 90 of the anchorage bracket 32. In addition, the fastener slots 34 are generally elongate and extend in a vertical direction (V) relative to the body of the anchorage bracket 32. As a result, the fastener slots 34 provide some room for adjustability of the retention hooks 30 within the fastener slots 34. The fastener slots 34 have a width (H) that is smaller and designed to closely receive the retention hooks 30 of one retention clip 20 in a snap-fitting arrangement. However, it is also contemplated that the fastener slots 34 may closely receive the retention hooks 30 such that any movement of the retention hooks 30, and consequently the back panel 16, are minimized. Regardless, the fastener slots 34 are configured to receive and securely engage the retention hooks 30.

With reference now to FIGS. 7A and 7B, the rear portion of the anchorage bracket 32 is illustrated. The anchorage bracket 32 is designed to be fastened or otherwise secured to the lower cross member 14 of the vehicle seating assembly 10 via fasteners that extend through fastener apertures 120 on the first and second lower flanges 92 and the first and second upper flanges 94. The first and second lower flanges 92 and the first and second upper flanges 94 closely complement the lower cross member 14 of the seatback frame 12. As generally disclose herein, the anchorage bracket 32 serves two main functions. The first function is to properly secure the back panel 16 to the seatback 48. The second function is to properly manage data and power wiring that extends through the seatback 48. The power and data wiring can be shown extending across both sides of the seatback 48.

Figure 8B:
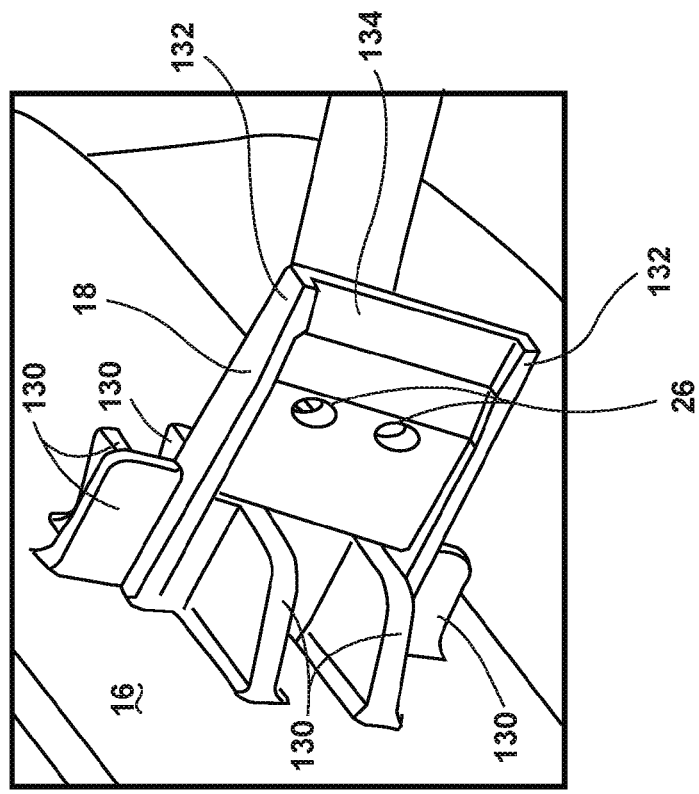
FIG. 8B is a top perspective view of the post of FIG. 8A with the retention clip removed.
Figure 8A:
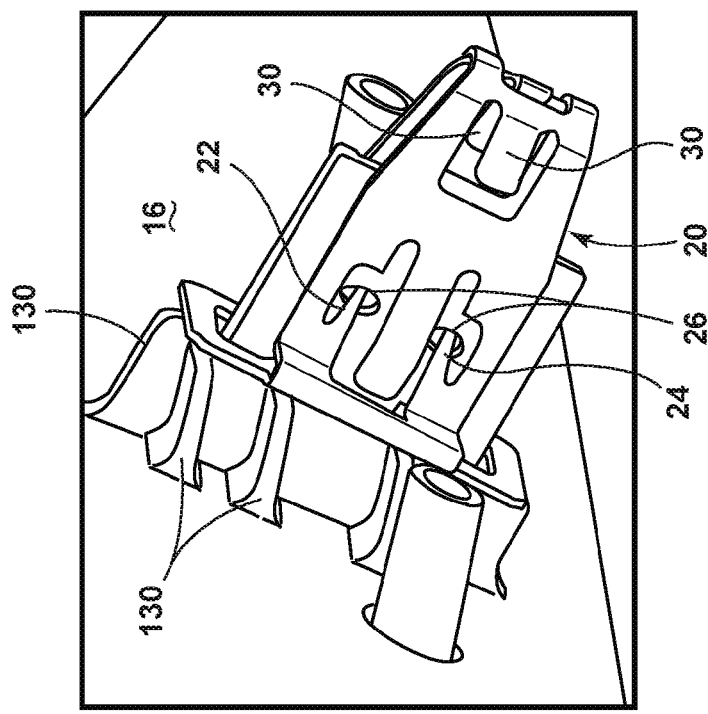
FIG. 8A is a top perspective view of a post extending from a hard back panel and engaged with a retention clip.
Figure 9A:
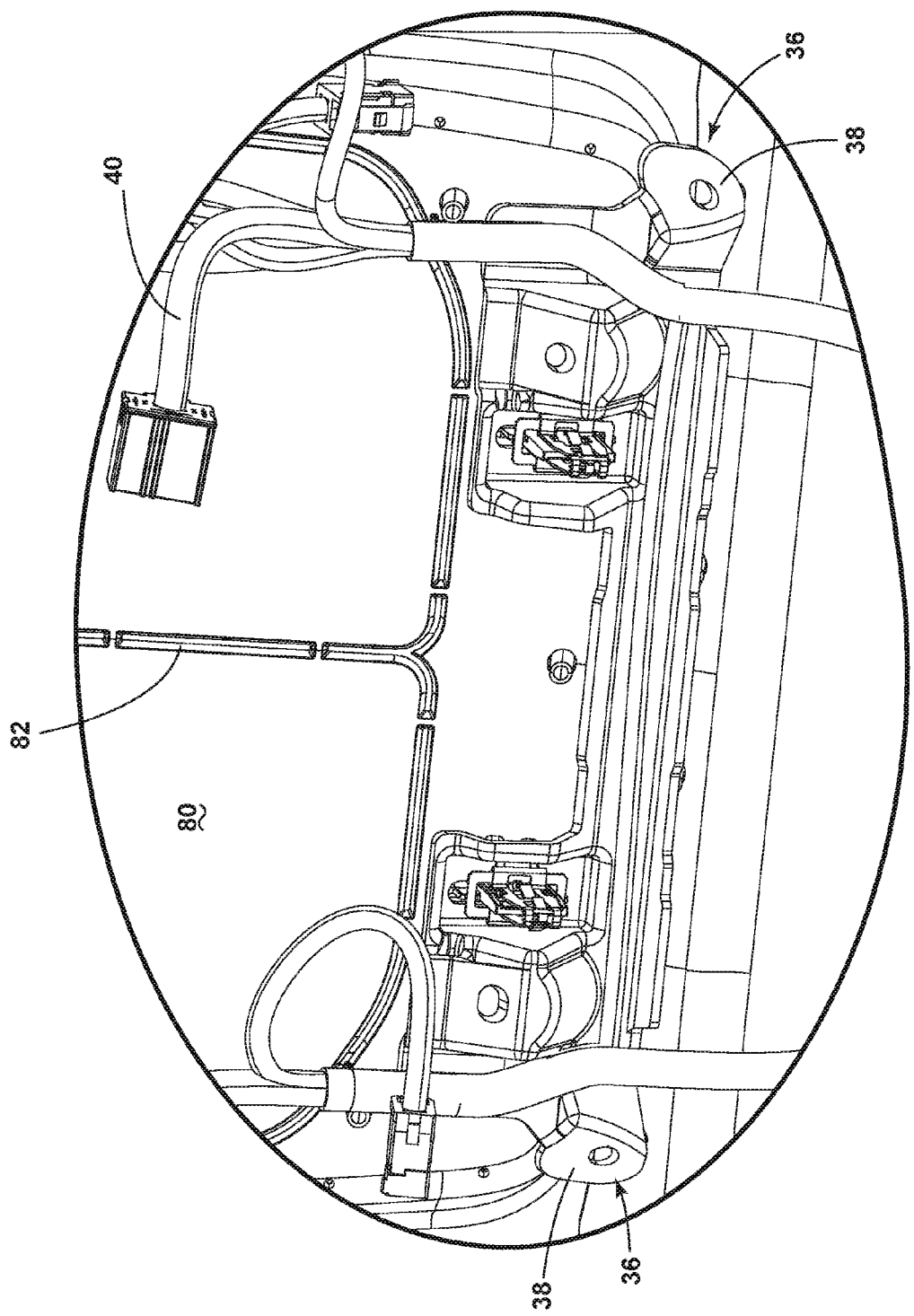
FIG. 9A is a top perspective view of one embodiment of wire harness features and an anchorage bracket of the present disclosure after engagement with a back panel.
Figure 9B:
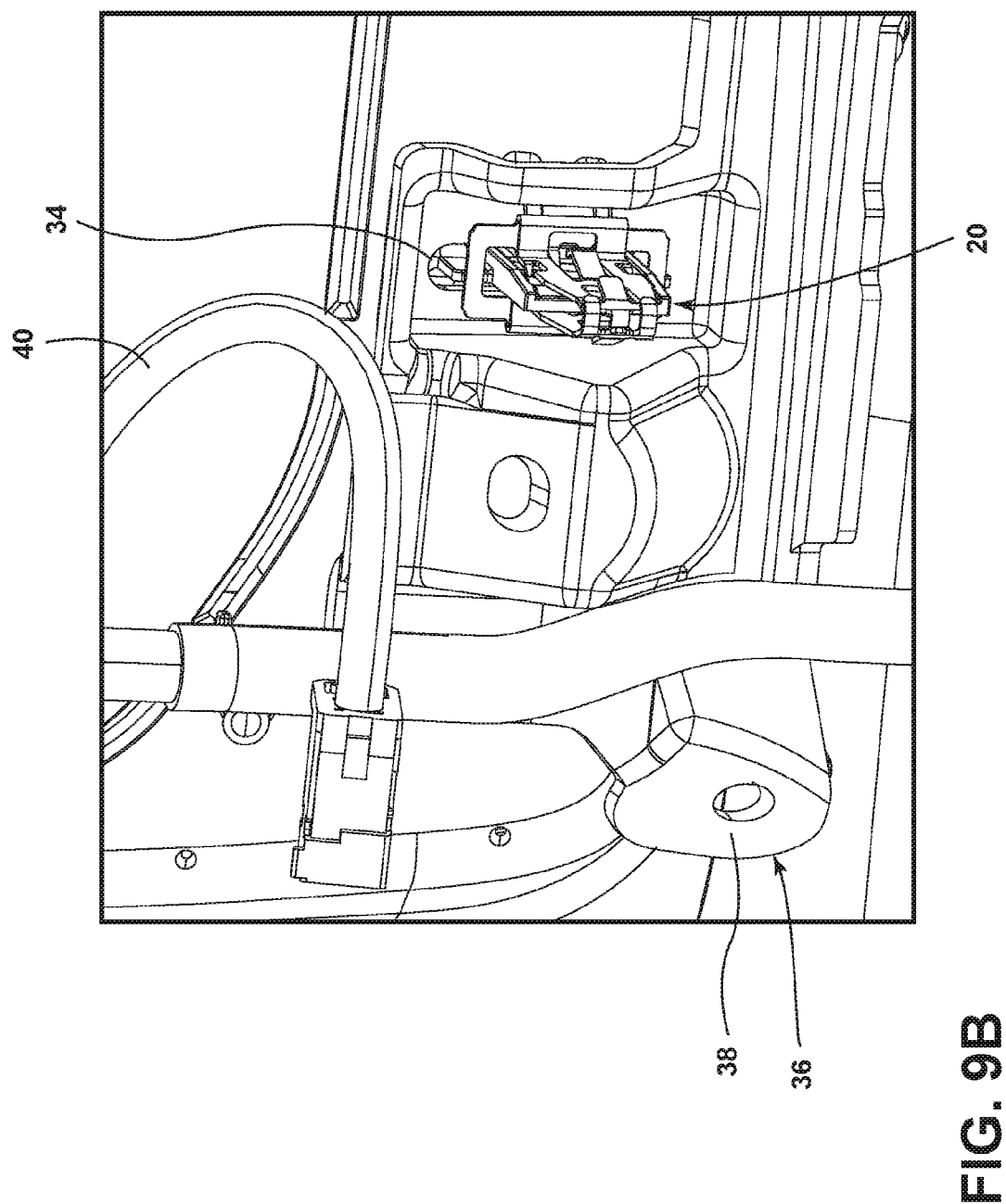
FIG. 9B is an enlarged top perspective view of an anchorage bracket managing wires with a wire harness, and at the same time securing the back panel to the vehicle seatback.

With reference now to FIGS. 8A and 8B, the retention clips 20 are configured to engage the first and second catches 22, 24 that engage the notches 26 on the internal posts 18 of the back panel 16. Each internal post 18 is integrally formed with the back panel 16 and specifically designed to receive the retention clips 20. Each internal post 18 includes a plurality of reinforcements 130 extending about a base of each internal post 18. In addition, each internal post 18 includes outside guides 132 that define a channel 134 configured to receive one retention clip 20. It will be understood by a person having ordinary skill in the art that the channel 134 may be disposed on more than one side of each internal post 18. The retention clips 20 rest on the internal posts 18 and include locating features that secure the retention clips 20 on the internal posts 18. In addition, the retention clips 20 also include the retention hooks 30. The retention hooks 30 are designed to specifically engage the fastener slots 34 of the anchorage bracket 32, and may engage with the first and second interconnecting regions 110 in a snap-fit arrangement, friction-fit arrangement, etc. The retention hooks 30 extend into and are secured inside the fastener slots 34 once secured with the anchorage bracket 32. As a result, the anchorage bracket 32 is secured with the back panel 16.

In sum, the back panel lower clip anchorage features, as set forth in the present application, are generally configured for easy installation of a back panel with an anchorage bracket that is secured to a lower cross member of a vehicle seat. The assembly provides a low cost alternative to a multitude of fasteners, and may provide a toolless design that is quickly and easily installed onto a vehicle seating assembly. The back panel, as well as the anchorage bracket, route wiring from the seatback to a seat base along the space defined between the back panel and a cushion of the seatback to provide consistent location of wires and minimize the potential for damaging the wiring when the vehicle is in use.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
 a seatback frame including a lower cross member;
 a back panel operably coupled to the seatback frame and including internal posts configured to receive a retention clip, the retention clip including first and second catches that engage notches on the internal posts of the back panel, the retention clips further including retention hooks; and
 an anchorage bracket operably coupled to the lower cross member and including:
  fastener slots configured to receive the retention hooks to secure the back panel with the anchorage bracket; and
  wire harness features disposed on distal ends of the anchorage bracket, wherein wiring is routed between the lower cross member and the anchorage bracket.

2. The vehicle seating assembly of claim 1, wherein the fastener slots are elongate in a vertical direction.

3. The vehicle seating assembly of claim 1, wherein the fastener slots extend through first and second interconnecting regions of the anchorage bracket, and wherein the first and second interconnecting regions protrude rearwardly from a central body of the anchorage bracket.

4. The vehicle seating assembly of claim 1, wherein the wire harness features include a vertically extending elongate body that transitions wiring between the seatback frame and the anchorage bracket.

5. The vehicle seating assembly of claim 3, wherein the central body of the anchorage bracket is defined by a substantially vertically aligned portion and a substantially horizontally aligned portion that extends forward from the vertically aligned portion.

6. The vehicle seating assembly of claim 1, wherein the back panel includes a controlled deformation area.

7. The vehicle seating assembly of claim 6, wherein the controlled deformation area includes a generally W-shaped configuration.

8. A vehicle seating assembly comprising:
a seatback frame including a lower cross member;
a back panel; and
an anchorage bracket operably coupling the back panel to the lower cross member, the anchorage bracket including:
fastener slots configured to receive fasteners from the seatback frame; and
wire harness features disposed on distal ends of the anchorage bracket, wherein wiring is routed between the lower cross member and the anchorage bracket.

9. The vehicle seating assembly of claim 8, wherein the fastener slots extend through first and second interconnecting regions of the anchorage bracket, and wherein the first and second interconnecting regions protrude rearwardly from a central body of the anchorage bracket.

10. The vehicle seating assembly of claim 8, wherein the back panel includes forward protruding internal posts configured to engage the anchorage bracket.

11. The vehicle seating assembly of claim 10, wherein the forward protruding internal posts include removable retention clips.

12. The vehicle seating assembly of claim 11, wherein the retention clips include retention hooks that engage notches in the forward protruding internal posts.

13. The vehicle seating assembly of claim 11, wherein each forward protruding internal post includes outside guides that generally define a channel in the forward protruding internal post.

14. The vehicle seating assembly of claim 8, wherein the back panel includes a controlled deformation area.

15. The vehicle seating assembly of claim 14, wherein the controlled deformation area includes a generally W-shaped configuration.

16. A vehicle seating assembly comprising:
a seatback frame;
a back panel; and
an anchorage bracket coupling the back panel to the seatback frame and including:
a lower support body;
first and second fastener receptacles configured to receive fasteners from the seatback frame, wherein a recess is defined between the lower support body and the first and second fastener receptacles; and
wire harness routers disposed on distal ends of the anchorage bracket that route wiring across the lower support body.

17. The vehicle seating assembly of claim 16, wherein the back panel includes forward protruding internal posts configured to engage the anchorage bracket.

18. The vehicle seating assembly of claim 17, wherein the forward protruding internal posts include removable retention clips.

19. The vehicle seating assembly of claim 18, wherein the retention clips include retention hooks that engage notches in the forward protruding internal posts.

20. The vehicle seating assembly of claim 18, wherein each forward protruding internal post includes outside guides that generally define a channel in the forward protruding internal post.

* * * * *